(12) United States Patent
Böhm et al.

(10) Patent No.: US 9,039,551 B2
(45) Date of Patent: May 26, 2015

(54) REAR DERAILLEUR DEVICE FOR A BICYCLE SHIFTING SYSTEM

(71) Applicant: SRAM Deutschland GmbH, Schweinfurt (DE)

(72) Inventors: Robert Böhm, Mainberg (DE); Tobias Harcke, Schwebheim (DE); Andreas Benz, Mainberg (DE); Oliver Rodegro, Hassfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 379 days.

(21) Appl. No.: 13/680,252

(22) Filed: Nov. 19, 2012

(65) Prior Publication Data

US 2013/0130853 A1    May 23, 2013

(30) Foreign Application Priority Data

Nov. 18, 2011 (DE) .......................... 10 2011 118 912

(51) Int. Cl.
    *B62M 9/124*     (2010.01)
    *B62M 9/1244*     (2010.01)

(52) U.S. Cl.
    CPC .............. *B62M 9/124* (2013.01); *B62M 9/1244* (2013.01)

(58) Field of Classification Search
    CPC ............................. B62M 9/124; B62M 9/1244
    USPC .................................. 474/80, 82; 70/233–236
    See application file for complete search history.

(56) References Cited

U.S. PATENT DOCUMENTS

| | | |
|---|---|---|
| 3,748,916 A | 7/1973 | Morse |
| 3,973,447 A | 8/1976 | Nagano |
| 2008/0026891 A1 | 1/2008 | Oseto |
| 2008/0081716 A1 | 4/2008 | Watarai et al. |
| 2013/0288834 A1* | 10/2013 | Yamaguchi ..................... 474/80 |

FOREIGN PATENT DOCUMENTS

| | | |
|---|---|---|
| CH | 284668 | 7/1952 |
| DE | 2153407 | 12/1972 |
| DE | 2557975 | 4/1977 |
| DE | 102007012509 | 2/2008 |
| EP | 1902936 | 3/2008 |

* cited by examiner

*Primary Examiner* — William E Dondero
*Assistant Examiner* — Robert T Reese
(74) *Attorney, Agent, or Firm* — Milan Milosevic; Lisa Serdynski

(57) ABSTRACT

A derailleur device, particularly a rear derailleur, includes at least one locking device for locking a chain guide at least in one locking position that is different from the starting position in relation to a movable element, and it is provided therein that the locking device includes a locking element displaceable between a passive position, in which the chain guide is released in relation to the movable element, and at least one active position, in which the chain guide is held in the at least one locking position.

14 Claims, 6 Drawing Sheets

REAR DERAILLEUR DEVICE FOR A BICYCLE SHIFTING SYSTEM

BACKGROUND OF THE INVENTION

The present invention relates to a derailleur gear changing device for a bicycle shifting system, particularly a rear derailleur.

A derailleur device is known from the prior art. U.S. Pat. No. 3,973,447 specifies a derailleur device in which a chain guide device is configured having two return sprockets. By means of a fixedly disposed locating pin, it is possible to lock the chain guide device in a predetermined deflection position in relation to a movable element to which the chain guide device is pivotably fastened.

As further prior art, reference is being made to documents DE 2 153 407 A1 and DT 25 57 975 B1.

Bicycle shifting systems that provide for a sprocket cassette having a plurality of sprockets on the rear axle of a bicycle, wherein depending on the selected gear the chain is positioned on larger or smaller sprockets by means of the derailleur device are widely used and, in the meantime, have become reliable in terms of their functionality. It has become clear, however, that particularly when the back wheel is disassembled from and then reassembled with such bicycle shifting systems, such as for the purpose of repair work or for returning the bicycle from a transportation state into a ready-to-ride state, particularly "threading" the axle of the back wheel into certain receiving areas of the rear fork of the frame causes difficulties especially if a derailleur device of this kind is provided with a rear derailleur device. Due to the spring-induced holding forces that are in effect in such derailleur devices, the derailleur device moves automatically out of the starting position thereof in accordance with the holding forces during the removal of the back wheel and the sprocket cassette attached thereto. When the back wheel is subsequently reassembled, the course of the chain obstructs the assembly of the back wheel and the threading action, as indicated above, because of said starting position. In addition to threading the axle into the receiving areas of the rear fork of the frame, which is already problematic by and of itself, the derailleur device must also be deflected, counteracting the spring forces, from the starting position thereof into an operating position in order to give the chain a course that allows for the assembly of the back wheel. Simultaneously threading the rear axle into the receiving areas of the bicycle frame and positioning the derailleur device such that assembly of the back wheel is possible usually requires a certain skill level by the installer. Furthermore, said installer must also move oil-lubricated and often soiled parts therein in an effort to position the derailleur device into a position that is conducive to assembly, which is not desired. Finally, in some constructions, it is even required for the installer to touch the lubricated and typically soiled chain. An assembly of this kind is not pleasant.

The present invention addresses this problem and seeks to provide a rear derailleur device that provides for substantially easier assembly of the back wheel in contrast to the known prior art.

BRIEF SUMMARY OF THE INVENTION

This task is achieved by a rear derailleur device of the type as described in the introduction that provides that a locking device with a locking element that is displaceable between a passive position, in which the chain guide device is released in relation to the movable element, and at least one active position, in which the chain guide device is held in the at least one locking position.

One aspect of the derailleur provides a base body that can be fastened on the bicycle frame, a movable element that is coupled to the base body and displaceable in relation to the same, a chain guide device that is coupled to the movable element and pivotable in relation to the same around a pivot axis, a biasing device by means of which the chain guide device is biased in relation to the movable element around a pivot axis in a starting position, wherein the chain guide device is pivotable around the pivot axis from the starting position against a tension force of the biasing device into different operating positions, and at least one locking device that is provided to lock the chain guide device in at least one locking position other than the starting position in relation to the movable element.

In contrast to the prior art that provides either for a passive locking device or no locking device at all, which is why it does not offer a satisfactory remedy for ease of assembly when installing the back wheel, the present invention provides for the derailleur device to be brought into an assembly state, so to speak, in an active manner and for it to be able to be held therein. This is achieved in that the locking device is brought from the passive position, in which it allows for conventional operation of the derailleur device without compromise, into the locking active position, in which it fixes the derailleur device in place in a predetermined operating position and maintains it, so to speak, in a state of ease of assembly, whereby it allows for easy threading of the back wheel into the bicycle frame. During the threading action, the installer must no longer also pay attention to manipulating and positioning the derailleur device itself. Instead, with the derailleur device according to the invention, the installer can move the derailleur device in advance from the passive position thereof into the locking active position thereof and thus maintain the locking device in a desired position for ease of assembly, meaning in the locking position in which the chain guide device is positioned and held for easy assembly of the back wheel.

The present invention thus allows for pre-positioning the derailleur device for assembly and holding it in this position until the assembly of the back wheel has been completed. During this step, or as a consequence thereto, it is possible to return the locking device automatically, upon operating the gear shifter or by actuating the locking element, from the active position into the passive position thereof and a conventional operating state in which switching of the gears is possible.

Furthermore, the present invention also simplifies the assembly of the chain because the same can be guided with more ease, due to the return sprockets of the derailleur device It is to be noted that a single locking position is typically sufficient for the derailleur device. If necessary, it is also possible, however, to provide a plurality of locking positions, depending on which switching state has been achieved at a given time, for example, depending on whether the derailleur device has assumed a switching state in which the chain is guided over a small sprocket or a large sprocket of the sprocket cassette that is mounted on the axle of the back wheel.

An improvement of the invention provides for the locking device to include at least one contacting element that can engage with the locking element in the at least one locking position in order to lock the chain guide device. The contacting element therein is configured especially for an interaction with the locking element in the locking position and ensures that the chain guide device is held in the locking position by means of the locking element. In this context it can be envisioned for the locking element to be disposed on a component of a movable element and chain guide device and for the contacting element to be disposed on the other component of movable element and chain guide device. The locking element can be, for example, a profiled trunnion, a contact area, or the like. Therefore, depending on necessity, the locking element is thus disposed on the movable element or on the chain guide device, while the contacting element is disposed on the respective other component. Arrangement on the one or the other component can be implemented depending on constructive and structural circumstances. The crucial aspect of this embodied example lies in establishing a reliable interaction between locking element and contacting element.

In one embodied variant according to the invention, it can be provided that the locking element is displaceable in the direction of the pivot axis or parallel in relation to the same. In the alternative, it can be possible for the locking element to be displaceable in the transverse direction in relation to the pivot axis, preferably in a plane that is essentially orthogonal in relation to the pivot axis. A further alternative provides for the locking element to be pivotable around an axis of rotation that is not parallel in relation to the pivot axis. For example, it is possible for the locking element to be displaceable between the active position and the passive position along a longitudinal axis. Correspondingly, the locking element can be a bolt or a latch that is correspondingly linearly displaceable. Preferably, it is envisioned for the locking element to be preloaded or biased in the passive position. This prevents the locking element from inadvertently being moved by vibrations or other types of mechanical stresses during the riding action from the passive position thereof into the active position thereof, thereby locking the derailleur device, although this is not at all intended by the rider. The bias of the locking element in the passive position ensures that only by actively overcoming said bias, meaning only when it is in fact intentional, will the locking element move from the passive position into the active position thereof and will indeed lock the derailleur device in the at least one locking position.

Another embodied variant provides for the locking element to be constituted of a push bolt that is configured having a contact area or a holding profile by means of which it is able to engage with one of these components in the locking position in a positive or non-positive manner for locking the chain guide device in relation to the movable element. In this embodied variant, the push bolt can, for example, be received in a positive manner in a corresponding receptacle when it is in the locking position, whereby it securely couples the movable element to the chain guide device. In the alternative, it is also possible for the holding profile to engage with a profiled counter-surface, whereby the two components chain guide device and movable element are held together in a positive manner.

The push bolt can be configured as a latch or a clamping bolt. It can be envisioned therein that the push bolt includes a pressure area or an actuation projection for manual actuation. It has been indicated previously that the locking element can be biased by a spring. The same applies also for the push bolt of the special embodiment, which is preferably spring-biased in the passive position thereof and can be actuated against said spring bias.

An alternate embodied variant according to the invention provides that the locking element is constituted of a swing bracket that can be pivoted between the locking position of the passive position. A swing bracket of this type can be pivoted from the passive position into the active position. The swing bracket can also be spring-biased, either by an additional spring or by an inherent internal stress. According to the invention, the latter is achieved, for example, in that the swing bracket is produced of, for example, a spring wire the ends of which are supported with an axial offset whereby the spring effect is generated. The swing bracket can act in conjunction with the contacting element. The contacting element therein can be configured as a profiled contact bolt. The swing bracket itself can also have a recess or profile that provides for secure receiving action of the contacting element.

An improvement of the invention provides that the locking element can be fixed in place in the locking position thereof, preferably by a spring-type bias or by means of wedging or latching. The spring-type bias can be achieved by an additional spring component or internal stress. The wedging or latching action can be achieved by a form closure or force closure.

An improvement of the invention provides that the derailleur device is configured having a damping device that is provided between the movable element and the chain guide device for the damping of the relative movement between these components. Damping devices of this type are provided to protect gear shifters intended for use on cross-country bikes, so-called mountain bikes, against excessive vibration. When travelling across uneven terrain, pivotable chain guide devices are indeed frequently excited to oscillate against the bias force, which can in extreme cases result in an inadequate force transmission by the chain, even faulty functioning of the gear shift. Damping devices are provided to avoid such excitation of oscillations, or at least minimize them. However, said damping devices have the disadvantage that they can complicate the assembly, as discussed in the introduction, even further, because it is necessary to overcome the damping forces as well that are generated by the damping device, when the chain guide device is brought in a position that demonstrates ease of assembly. Correspondingly, the present invention for an expedient locking device is not only but particularly advantageously beneficial on such derailleur devices that are equipped with corresponding damping devices.

An improvement of the invention provides for the damping device to include a frictional device for executing frictional forces relative to the movable element during the pivoting action of the chain guide device.

BRIEF DESCRIPTION OF THE SEVERAL VIEWS OF THE DRAWINGS

The invention is explained by way of example below based on the attached figures.

DETAILED DESCRIPTION OF THE INVENTION

Figure 1:
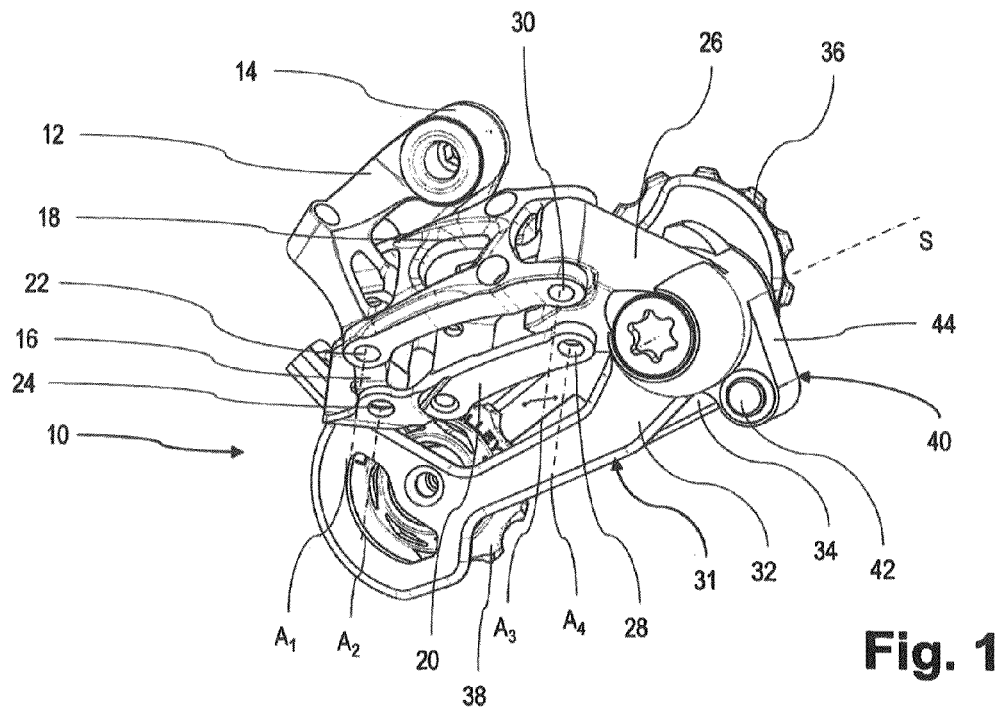
FIG. 1 is a derailleur device according to the invention in the starting position thereof.
Figure 2:
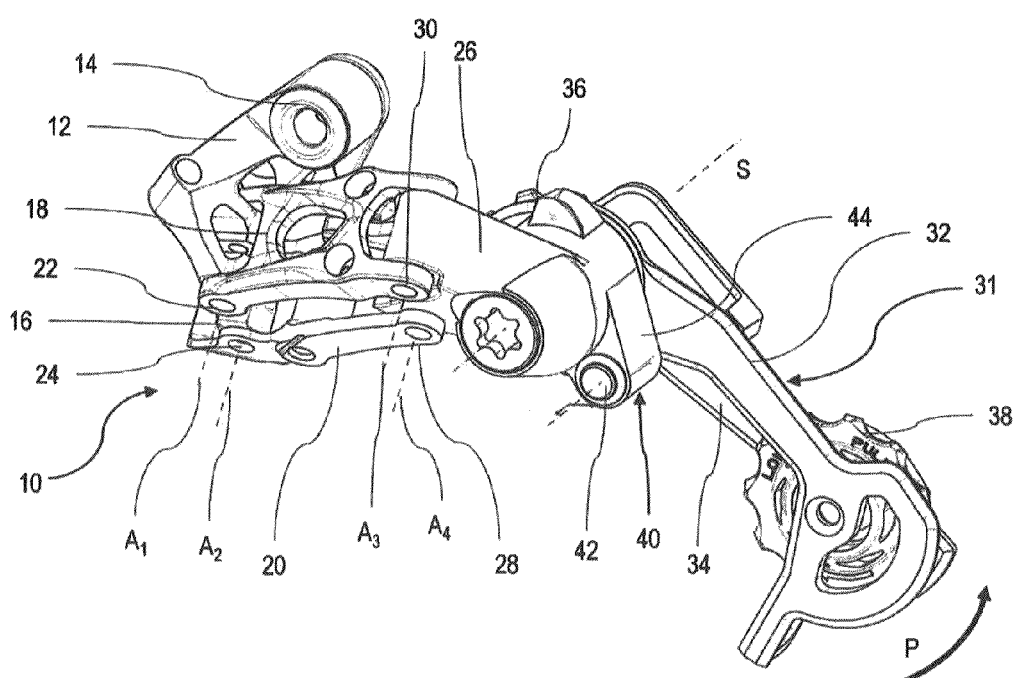
FIG. 2 is the derailleur device according to the invention in an operating position.

FIGS. 1 and 2 show a spatial representation of a derailleur device in form of a chain derailleur fastenable to the fork of a back wheel of a bicycle frame, generally designated by the numeral 10. The derailleur device 10 includes a base body 12 that can be fastened by means of a mounting eyelet 14 in a manner known from the prior art to the bicycle frame. The base body 12 is offset multiple times and includes at the end thereof that is directed away from the mounting eyelet 14 a support portion 16. Two pivot arms 18, 20 are pivotably supported by means of support pins 22, 24 on this support portion 16 in relation to the base body 12. At the free ends of the pivot arms 18 and 20 that are directed away from the base body 12, the same are also pivotably connected to a movable element 26. Again, the support pins 28, 30 serve for this purpose as well. The support axes A1, A2, A3, A4 of the respective pivotable support are parallel in relation to each other and constitute, in an axis-orthogonal plane, essentially the corner points of a parallelogram. Therefore, with an essentially parallel pivoting action of the two support arms 18 and 20, the movable element 26 moves relative to the base body 12 along an orbit and is therein, based on the effect of the parallelogram lever arrangement 16, 18, 20, 26, held in a desired set alignment.

A chain guide device 31 is supported on the movable element 26 with the ability to pivot around a pivot axis S. The chain guide device 31 comprises a first arm-type chain guide member 32 and a second chain guide member 34, which is disposed essentially parallel to the former. A first (return) sprocket 36 is provided between the two chain guide members 32, 34 in proximity to the movable element, and a second (return) sprocket 38 that is, disposed remotely from the same is provided, both of which are supported between the two chain guide members 32 and 34 in a low-friction manner. The sprockets, also known as pulleys 36, 38 guide a chain (not shown) in an S-shaped manner as known from the prior art.

The movable element 26 has disposed therein, on the one hand, a well-known spring arrangement (first biasing element) and, furthermore, a damping arrangement. The spring arrangement ensures that the derailleur device is biased around the pivot axis S, particularly the chain guide device 31, in the starting position as shown in FIG. 2. In the operating position as shown in FIG. 2, the chain guide device was displaced around a pivot axis S in relation to the movable element 26 corresponding to an arrow P against the action of the spring arrangement.

Furthermore, the present invention provides a locking device 40. In the embodied variant as shown in FIGS. 1 to 5, said locking device includes a bolt 42, which may also be referred to as a push bolt or clamping bolt, that can be moved against the action of a spring force from a passive position (FIG. 4) into an active position (FIG. 5) in which it holds the chain guide device 31 in a preset operating position, as shown, for example, in FIGS. 2, 3 and 5. In the passive position thereof (see FIG. 4), on the other hand, the bolt 42 does not exercise any locking effect, and the chain guide device 31 can assume its starting position (see FIG. 1) following the effect of the spring device that is disposed inside the movable element 26 (not shown).

Figure 3:
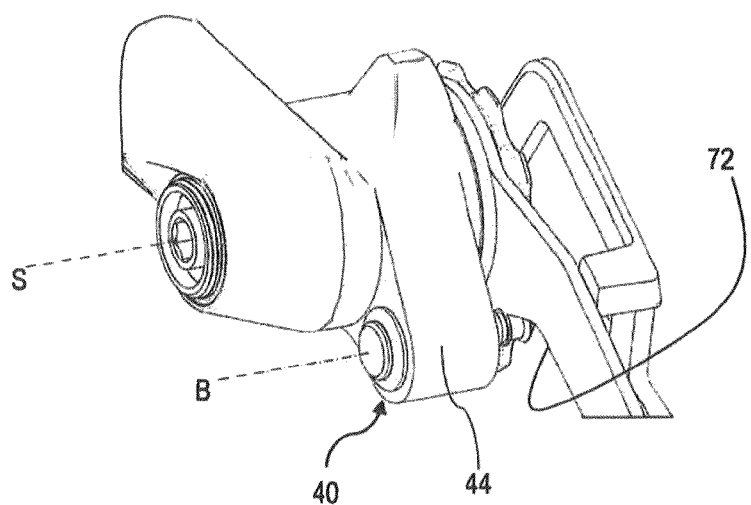
FIG. 3 is a detail view of a first embodied example of the derailleur according to the invention having a locking device.
Figure 4:
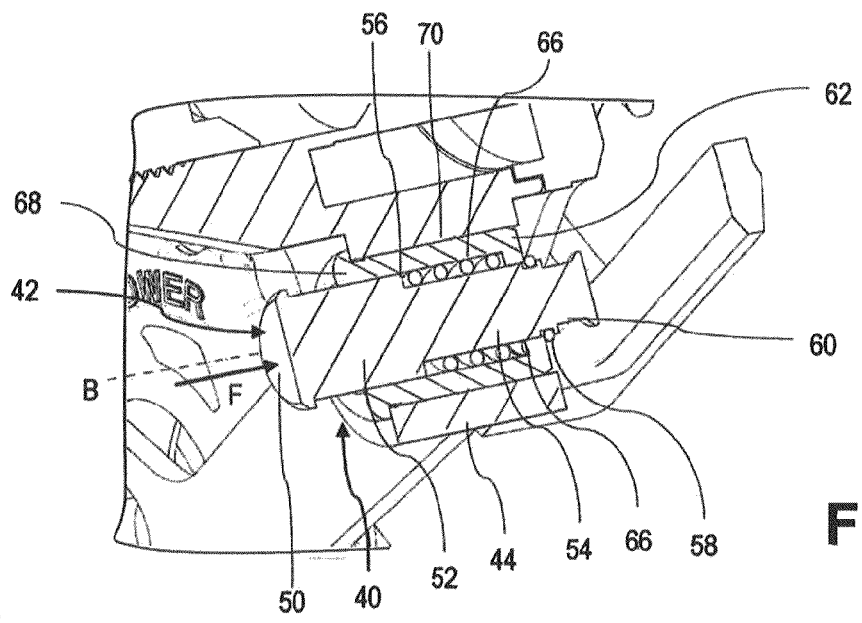
FIG. 4 is a sectional view of FIG. 3.
Figure 5:
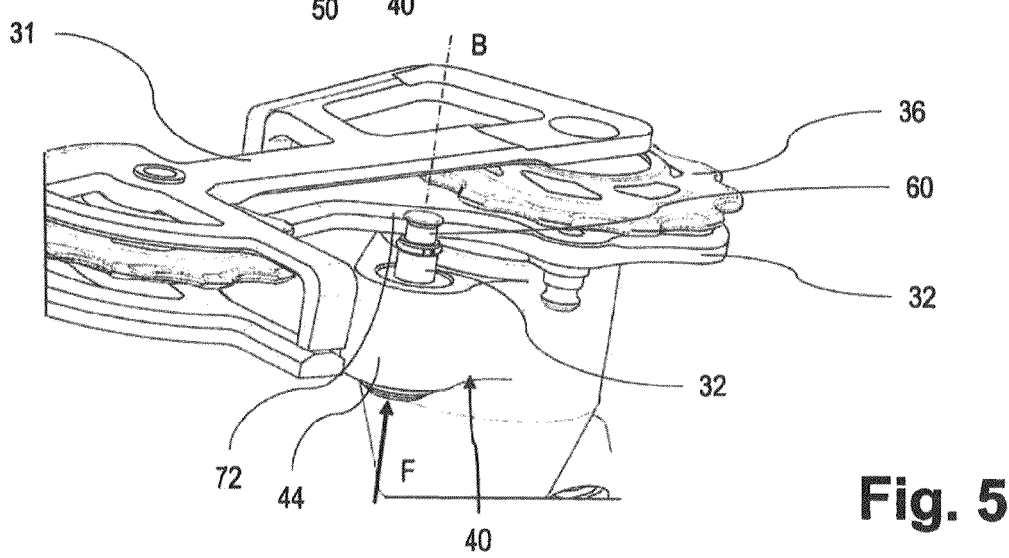
FIG. 5 is a further detail view of FIG. 3 from a different perspective.

Below, the details of the locking device 40 shall be discussed in detail according to FIGS. 3 to 5. The bolt 42 is accepted by a projection 44, which is disposed on the movable element 26, and linearly displaceable along an actuation axis B that runs essentially parallel in relation to the pivot axis S. In the sectional view according to FIG. 4, it can be seen that the bolt 42 includes a head section 50, a cylindrical guide section 52, a guide section 54 that has a reduced diameter in contrast to the former, wherein a shoulder 56 is formed between the two guide sections, a recess 58 and a profile section 60 that is configured at the free end of the same and provided with an undercut. The bolt 42 is received inside a bushing 62 and biased inside the same by means of a second biasing element, which may be in the form of a pressure spring 64 in the passive position thereof as shown in FIG. 4. A snap ring is disposed in the recess 58 that serves as a stop for the passive position. The spring 64 supports itself, on the one end, on the shoulder 56 and, on the other end, on a floor area 66 of the bushing 62. The bushing 62 is positioned over a flange 68 in a cylindrical opening 70 within the projection 44.

In FIG. 4, it can be seen that upon applying a force F against the head section 50 of the bolt 42, the same can be moved along the actuation axis B in FIG. 4 toward the right against the spring force of the pressure spring 64. This allows for the same to be brought into contact with the contact area 72 on the chain guide member 32 of the chain guide device 31 by the profile section 60 thereof. The profiling on the profile section 60 ensures that the bolt 42 circum-grips said contact area 72, whereby it does not slip off and is retracted despite the restoring effect of the spring 64. Consequently, in its active position, as shown in FIGS. 3 and 5, the bolt 42 is able to hold the chain guide device 31 in a displaced operational position in contrast to the starting position (FIG. 1) (for example, in the operating position according to FIG. 2) counteracting the spring force of the spring device between the movable element 26 and chain guide device 31.

This has the advantage that, for example, even when the back wheel of the bicycle is disassembled, wherefore, due to the lack of a rear axle sprocket, there is no longer sufficient tension being applied to the chain, the chain guide device 31 is held in the position as shown in FIG. 2, due to the holding effect of the bolt 42 in the active position thereof. The chain is thereby (not shown) positioned in such a way together with the derailleur device that considerably simplifies the installation of the back wheel with a corresponding sprocket cassette in contrast to a state of the derailleur device in the starting position thereof according to FIG. 1.

Following the assembly, the derailleur 10 can be replaced in an operating position in that the chain guide device 31 is minimally pivoted further in the direction of the arrow P (see FIG. 2), wherein the bolt 42 automatically recoils under the effect of the spring to the passive position thereof (see FIG. 4). This can be achieved manually or by a corresponding actuation of a switching means. The derailleur device 10 is then ready to operate and can take any operational position on both sides of the operational position as shown in FIG. 2, meaning the chain guide device is able to rotate around the pivot axis S according to the spring load that acts upon it or corresponding to a certain chain tension.

Figure 6:
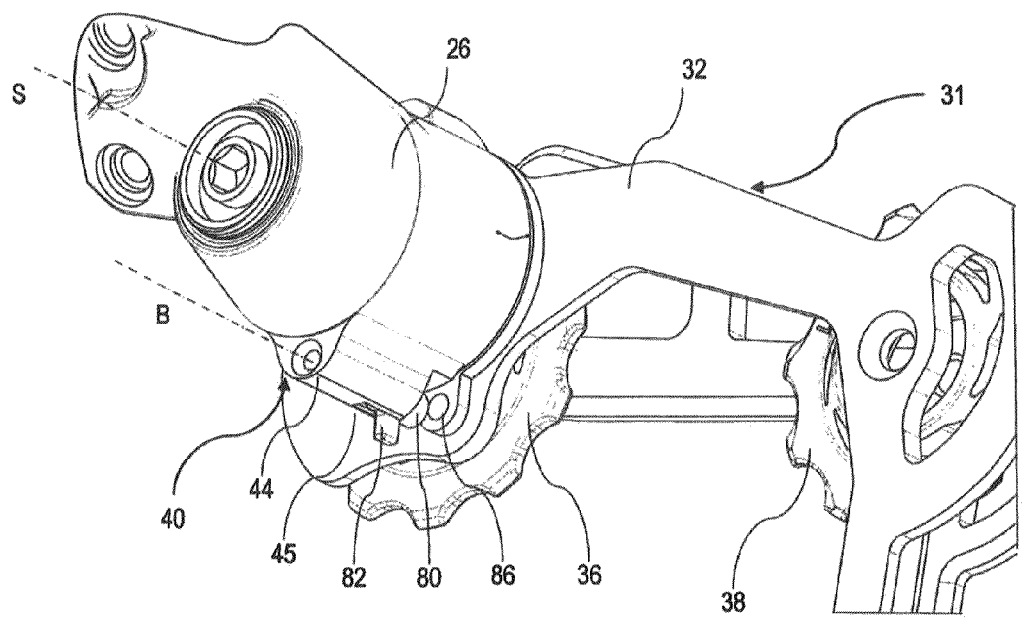
FIG. 6 is a detail view of a second embodied example of the derailleur device according to the invention having a latch-type locking device.
Figure 7:
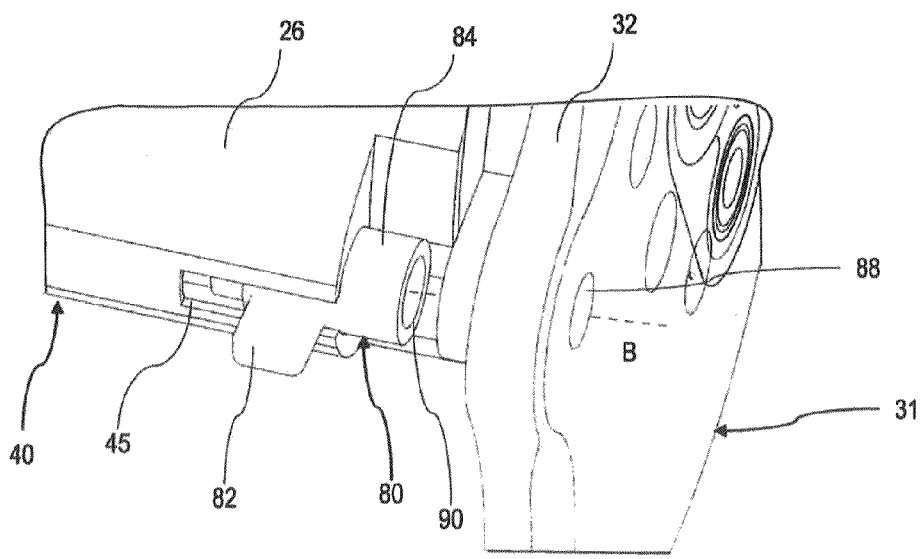
FIG. 7 is a three-dimensional detail view of the embodied example according to FIG. 6 from a different perspective.

FIGS. 6 and 7 show a second embodied variant of the derailleur according to the invention. Presently, only the differences in relation to the first variant will be addressed. Same reference signs will be used for equal or same-acting components, as in the description of FIGS. 1 to 5.

The embodied example according to FIGS. 6 and 7 differs from the first embodied example according to FIGS. 1 to 5 only in the configuration of the locking device 40. Again, a bolt 80 is provided in the projection 44 on the movable element 26. It is configured in the shape of a latch with a latch projection 82. The latch projection 82 is guided in a slot 45. The bolt 80 can be, as before, spring-biased or, however, only slidable against frictional forces in the projection 44. At the free end thereof, the bolt 80 is provided with a cylindrical outer circumferential area 84. By means of the same it is possible for it to be pushed in a locking manner into a correspondingly sized receiving opening 86. In the alternative or additionally, it is possible to insert via a passage opening 88 another bolt element (not shown) through the chain guide member 32 of the chain guide device as well as the receiving opening 90 in the bolt 80. This way, it is possible in turn to fix the chain guide device 31 in relation to the movable element 26 in a predetermined operating position and thereby in a position that offers ease of assembly in order to simplify the installation of a back wheel with a corresponding sprocket cassette.

Following assembly, the coupling between the movable element 26 and the chain guide device 31 can be disconnected once more by displacing the bolt 80 into a passive position in that the projection 82 is actuated, meaning by sliding the projection 82 along the slot 45 along the actuation or longitudinal axis B, and, if necessary, a corresponding pin is pulled out of the opening 88 and thereby removed from any engagement with the opening 90. Consequently, the derailleur device is once again ready to operate in the usual manner according to FIGS. 6 and 7.

Figure 8:
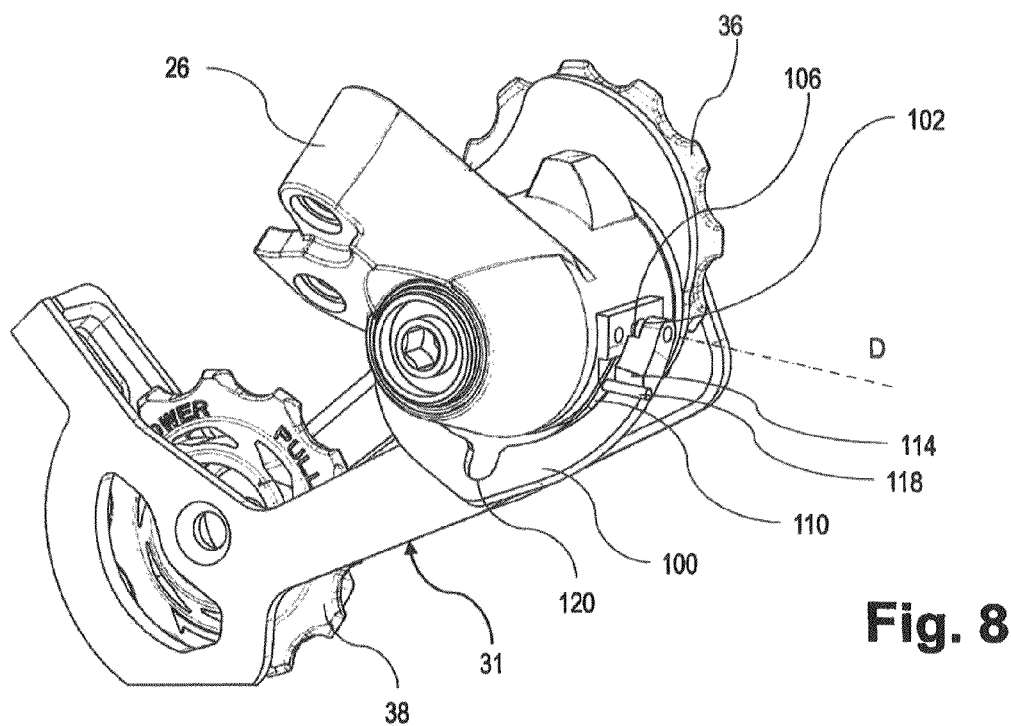
FIG. 8 is a detail view of a third embodied example of the derailleur device according to the invention having a bracket-type locking device.
Figure 9:
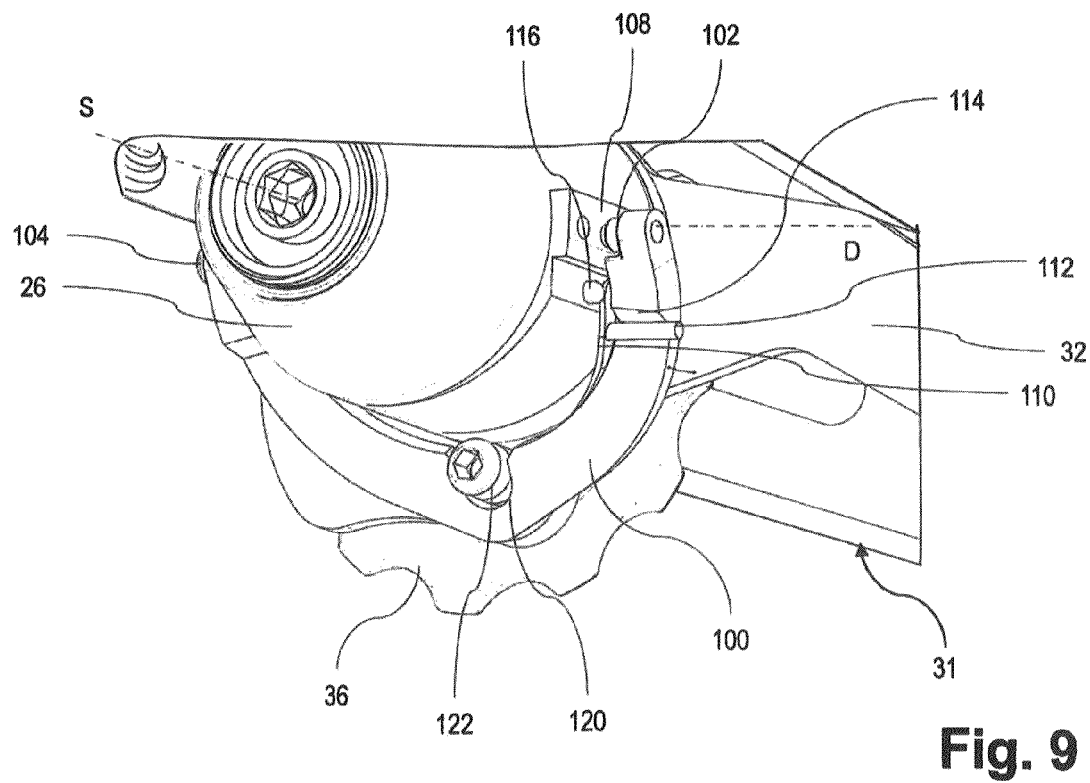
FIG. 9 is a three-dimensional detail view of the embodied example according to FIG. 8 from a different perspective.

FIGS. 8 and 9 show a third embodied example of the derailleur according to the invention. Said embodiment differs from the previously described embodied examples according FIGS. 1 to 7 in that a swing bracket 100 is provided instead of the bolt element that is linearly displaceable along an actuation axis B. The same is pivotably supported by means of corresponding swing pins 102, 104 in the corresponding recesses 106 that are configured on a suitable profile 108 on the movable element 26. For adjustment purposes, it is possible to envision a plurality of recesses 106. The bracket 100 is provided with a spring element 110 that is supported by means of a clamping pin 112 on a sloped surface 114. The spring element 110 acts in conjunction with the contact pin 116 that is also formed in one piece with the movable element 26.

FIG. 8 shows the bracket 100 in the passive position thereof, meaning it is pivoted around the axis of rotation D in such a way that it does not make contact with the chain guide device 31. It is biased and held by means of the spring 110 and the action of the same in this position. It can be seen that the bracket has a recess 120 at the bottom end thereof. In FIG. 9, the bracket is pivoted into its locking position (active position). In said position, it engages by the recess 120 thereof with the contact pin 122, wherein the recess 120 accepts the contact pin 122. The contact pin 122 is fixedly mounted to the chain guide member 32 of the chain guide device 31. For the locking position as shown in FIG. 9, the secure acceptance of the contact pin 122 in the recess 120 of the bracket 100, which is fastened to the movable element 26, means that any relative twisting of the chain guide device 31 in relation to the movable element 26 is locked. The chain guide device 31 in turn is held in place in a predetermined operating position in relation to the movable element 26, as described previously in reference to FIGS. 1 to 5, in order to thus simplify mounting the back wheel. Even in the locking position according to FIG. 9, the bracket 100 is stably held in position by means of the spring 110 in interaction with the contact pin 116. To undo this position, acting against the tension force of the spring 110 by actuating the journal 112, the bracket 100 is returned to the passive position as shown in FIG. 8, by twisting the same around the axis of rotation D, and in which position the derailleur device is ready to operate.

Figure 10:
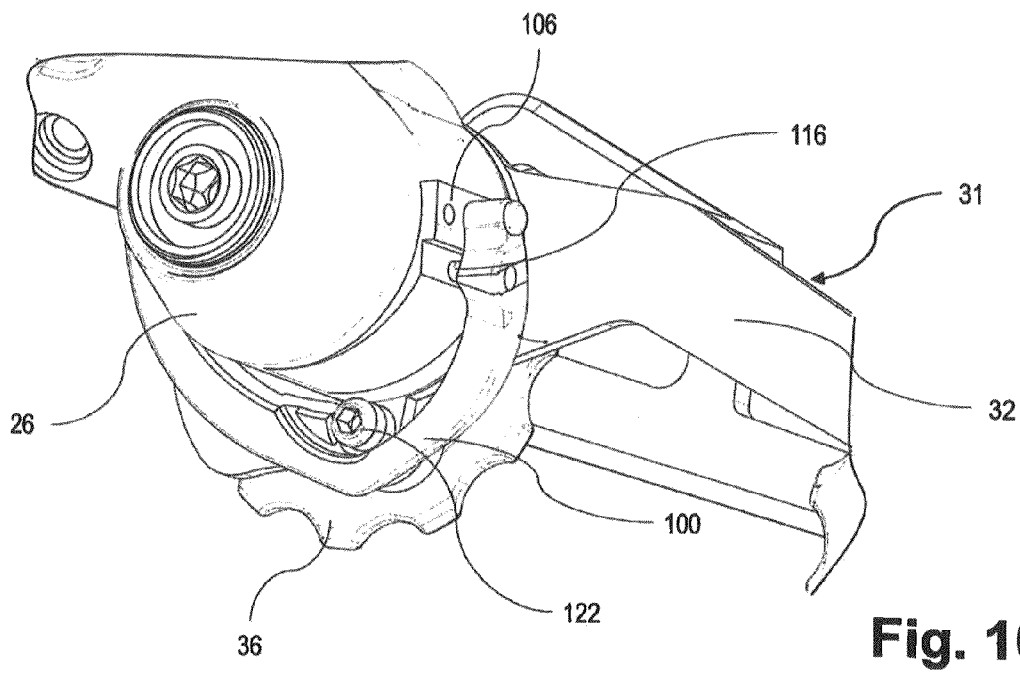
FIG. 10 is a detail view of a forth embodied example according to the invention.
Figure 11:
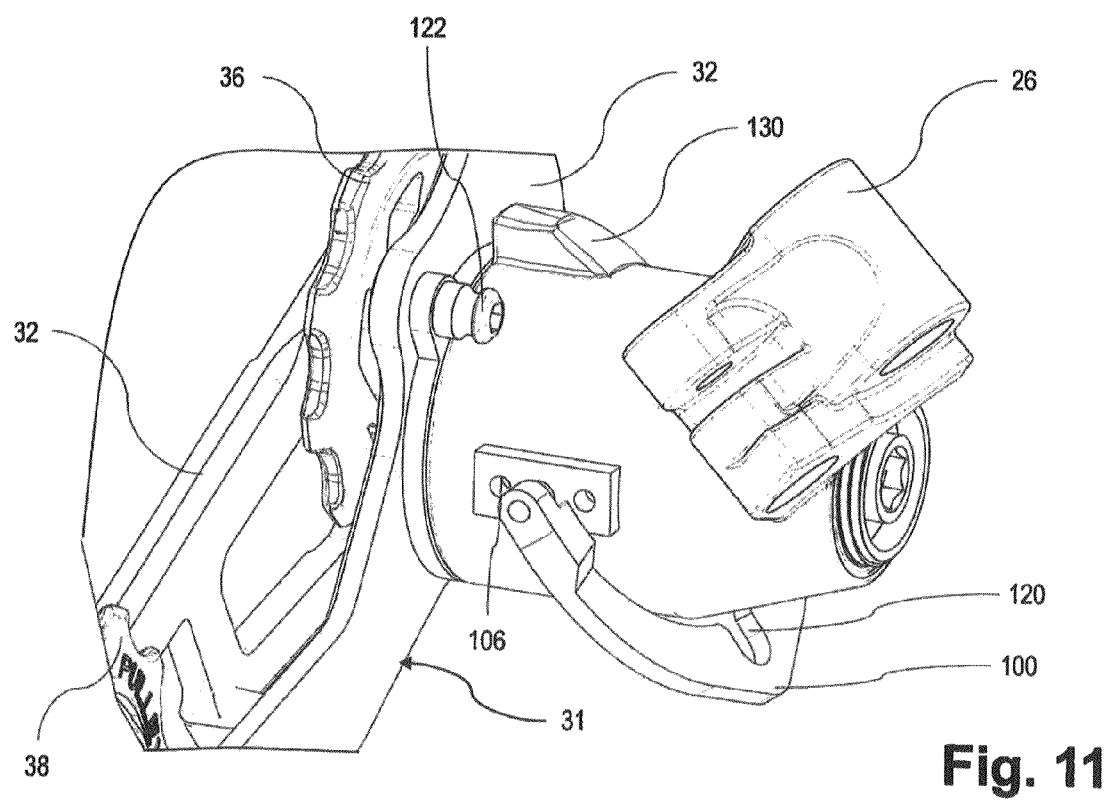
FIG. 11 is a detail view of a forth embodied example according to the invention from a different perspective.

FIGS. 10 and 11 show a fourth embodied example by way of a slight modification of the third embodied example according to FIGS. 8 and 9. In this embodied example, the spring element 110 has been omitted. The bracket 100 is instead pivoted by overcoming frictional forces. The bracket 100 can be latched by means of the contact pin 116 in the active position according to FIG. 10 and in the passive position thereof according to FIG. 11. FIG. 11 also demonstrates that, during normal operation of the derailleur, meaning when the locking device is in its passive position, the contact pin 122, which is fastened to the chain guide member 32, cannot interact with the bracket 100. This ensures safe operation of the derailleur 10. It is to be noted that FIG. 11 also depicts a stop 130 that provides for maximum displacement of the chain guide device 31 in relation to the movable element 26.

FIGS. 12 to 15 show further alternative embodied examples of the locking device having a bracket. Contrary to the embodied examples according to FIGS. 8 to 11, the bracket therein is not configured as being solid and having additional spring and latching means but as a bracket from a correspondingly shaped spring wire 140.

Figure 12:
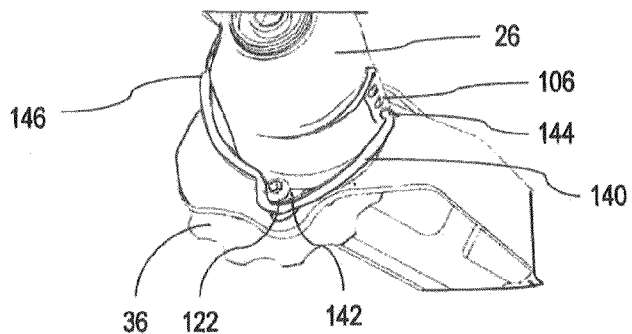
FIG. 12 is a detail view of a fifth embodied example according to the invention.

FIG. 12 shows the bracket 140 having a rounded or curved line, respectively, wherein a rounded nose 142 is formed in one piece with the bracket for interacting with the contacting element 122. Furthermore, also to be noted is the fact that the bracket is not fastened by the free ends 144, 146 thereof, which serve as journal pins, on a joint axis in the corresponding recesses 106 on the movable element 26 but instead with an axis offset d between two different support axes D1 and D2 of the journal pins. This provides the bracket with a bias by means of which it is achieved that the bracket can be moved between two pivot positions only by overcoming a corresponding spring-type bias force. In other words, this step of an arrangement with an offset axis of the two journal-type ends 144 and 146 of the bracket 140 ensures that the bracket can only be moved between the active and passive positions thereof by overcoming the spring-type forces.

Figure 13:
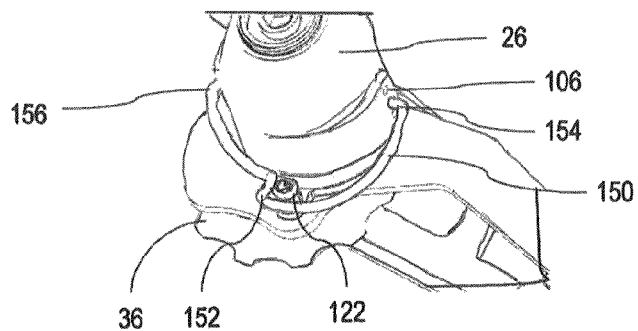
FIGS. 13-15 detail views of a sixth embodied example.
Figure 14:
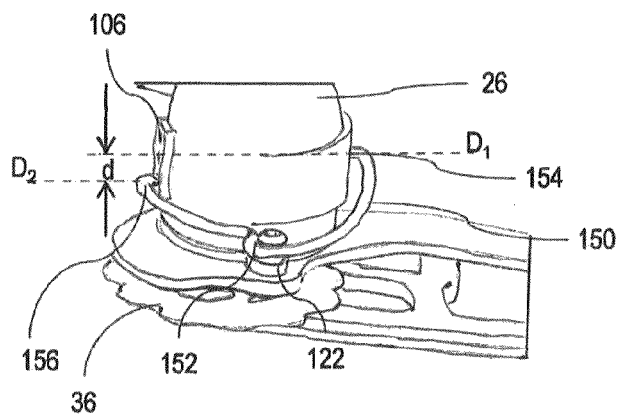
Figure 15:
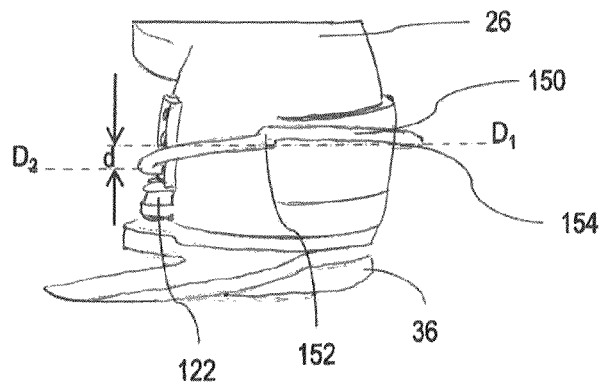

FIGS. 13 to 15 show a further embodied variant having the bracket 150 that acts in the same manner as described in reference to FIG. 12 for the bracket 140. The bracket 150, however, is less rounded and reshaped instead as somewhat more pointy or boxy, respectively, in the area of the nose 152. The interaction with the contact pin 122 occurs in the same manner as described above. FIG. 14 demonstrates the axis offset d of the two axes of rotation D1 for the journal-shaped end 154 and D2 for the journal-shaped end 156. FIG. 15 shows how the bracket 150 is pivoted into the passive position thereof and held therein by the spring force that is generated due to the axis offset. Furthermore, it can be seen that the contact pin 152 does not enter into an interaction with the bracket 150 when the chain guide device 31 is pivoted around the pivot axis S according to arrow P in the passive position thereof. Finally, FIG. 15 also demonstrates that the contact pin 152 is profiled as well and provided with a rounded continuous slot that ensures a positive acceptance of the bracket 150 and safe holding action in the locking position.

In total, the invention envisions various embodied examples all of which adhere to the basic principle of providing an actively switchable locking device, either by a bolt, a latch or a pivotable bracket or another type of locking element, in order to be able to lock the chain guide device in a targeted fashion in at least one preset operating position. This ensures that the chain guide device, aside from the tendency thereof to return to the starting position under the action of the inherent spring-type bias, can be locked in at least one operating position as well. Said operating position is typically selected in such a way that it allows for simplified assembly of the back wheel avoiding the previously described difficulties during the threading action of the back wheel axis into the rear bicycle fork involving inadvertent activation of the derailleur device and having to align the chain on the sprocket cassette that is disposed on the back wheel.

The assembly of the back wheel is considerably simplified if it is accompanied by corresponding locking action with regard to the derailleur device. This is especially beneficial in instances when the derailleur device is provided with a damping means that dampens the displacement movement between the movable part 26 and the chain guide device 31 by means of friction whereby the excitation of vibration is prohibited, or at least restricted during operation. A damping means of this kind complicates any conventional-type assembly even further. The invention thus remedies this problem as well because, due to the prior positioning of the chain guide device by means of the locking device in the manner as described, the installer does not have to "work" against the damping device as well.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A rear derailleur device for a bicycle shifting system, comprising:
   a base body fastenable to a bicycle frame;
   a movable element coupled to the base body and displaceable in relation thereto;
   a chain guide device coupled to the movable element and pivotable around a pivot axis;
   a first biasing element by which the chain guide device is biased around the pivot axis in a starting position in relation to the movable element, wherein the chain guide device is pivotable against the bias of the first biasing element from the starting position in different operating positions around the pivot axis; and
   at least one locking device for locking the chain guide device in at least one locking position that is different from the starting position in relation to the movable element,
   the locking device including a locking element displaceable between a passive position, in which the chain guide device is released in relation to the movable element, and at least one active position, in which the chain guide device is held in the at least one locking position.

2. The rear derailleur device according to claim 1, the locking device including at least one contacting element engageable with the locking element in the at least one locking position to lock the chain guide device.

3. The rear derailleur device according to claim 2, the locking element disposed on one of the movable element and the chain guide device, and the contacting element disposed on the other of the movable element and the chain guide device.

4. The rear derailleur device according claim 1, the locking element displaceable in the direction of the pivot axis or parallel in relation thereto.

5. The rear derailleur device according to claim 1, wherein the locking element is displaceable in a transverse direction in relation to the pivot axis in an orthogonal plane in relation to the longitudinal axis.

6. The rear derailleur device according to claim 1, wherein the locking element is pivotable around an axis of rotation that is not parallel in relation to the pivot axis.

7. The rear derailleur device according to claim 1, wherein the locking element is displaceable along a longitudinal axis between the active position and the passive position.

8. The rear derailleur device according to claim 1, wherein the locking element is biased in the passive position by a second biasing element.

9. The rear derailleur device according to claim 1, wherein the locking element includes a push bolt that has a contact area or a hold profile by which it engages in the locking position in a positive or non-positive manner for locking the chain guide device in relation to the movable element.

10. The rear derailleur device according to claim 9, wherein the push bolt includes a contact surface or an actuation projection for manual operation.

11. The rear derailleur device according to claim 1, wherein the locking element includes a swing bracket that is pivotable between the locking position and the passive position.

12. The rear derailleur device according to claim 1, wherein the locking element is fixable in its locking position by one or more of biasing, wedging, and latching.

13. The rear derailleur device according to claim 1, wherein a damping device is provided between the movable element and the chain guide device for damping of relative movement therebetween.

14. The rear derailleur device according to claim 13, wherein the damping device includes a friction device for applying frictional forces during the pivot action of the chain guide device in relation to the movable element.

* * * * *